(12) United States Patent
Lauer

(10) Patent No.: US 7,916,427 B1
(45) Date of Patent: Mar. 29, 2011

(54) ELECTROMAGNETIC HEADS, FLEXURES, GIMBALS AND ACTUATORS FORMED ON AND FROM A WAFER SUBSTRATE

(76) Inventor: Mark A. Lauer, Pleasanton, CA (US)

( * ) Notice: Subject to any disclaimer, the term of this patent is extended or adjusted under 35 U.S.C. 154(b) by 0 days.

(21) Appl. No.: 12/728,573

(22) Filed: Mar. 22, 2010

Related U.S. Application Data

(60) Continuation of application No. 11/880,605, filed on Jul. 23, 2007, now Pat. No. 7,684,158, which is a division of application No. 09/912,723, filed on Jul. 23, 2001, now Pat. No. 7,248,444.

(60) Provisional application No. 60/219,994, filed on Jul. 21, 2000.

(51) Int. Cl.
G11B 5/56 (2006.01)
G11B 5/48 (2006.01)
G11B 21/16 (2006.01)

(52) U.S. Cl. .............. 360/294.4; 360/244.4; 360/245.3

(58) Field of Classification Search .............. 360/294.4, 360/244.4, 245.3, 294.5, 294.6
See application file for complete search history.

(56) References Cited

U.S. PATENT DOCUMENTS

| | | | |
|---|---|---|---|
| 5,453,315 A * | 9/1995 | Hamilton et al. | 428/209 |
| 5,663,854 A * | 9/1997 | Grill et al. | 360/244.4 |
| 6,507,463 B1 * | 1/2003 | Boutaghou | 360/294.3 |
| 6,735,049 B1 * | 5/2004 | Lauer | 360/244.1 |
| 6,851,120 B2 * | 2/2005 | Crane et al. | 720/674 |
| 7,248,444 B1 * | 7/2007 | Lauer | 360/294.4 |
| 7,617,588 B1 * | 11/2009 | Lauer | 29/603.12 |
| 7,684,158 B1 * | 3/2010 | Lauer | 360/294.4 |
| 2001/0055183 A1 * | 12/2001 | Cain et al. | 360/318 |

FOREIGN PATENT DOCUMENTS

| JP | 62204480 A | * | 9/1987 |
|---|---|---|---|
| JP | 08203230 A | * | 8/1996 |

* cited by examiner

Primary Examiner — William J Klimowicz
(74) Attorney, Agent, or Firm — Mark Lauer

(57) ABSTRACT

Devices for reading or writing electromagnetic information include a wafer substrate piece disposed between an electromagnetic transducer and an electrostrictive or piezoelectric actuator. The substrate piece is shaped as a rigid body adjoining the transducer and as a flexible element connecting the body and the actuator. To fabricate, at least one electrostrictive layer and many transducers are formed on opposite sides of a wafer that is then cut into rows containing plural transducers. The rows are processed from directions generally normal to the wafer surface upon which the transducers were formed, by removing material to form a head, flexures and a media-facing surface on the head. Conductive leads are formed on a back surface of flexures connecting the transducer with drive electronics. The flexures are aligned with forces arising from interaction with the media surface and from seeking various tracks, reducing torque and dynamic instabilities and increasing actuator access time.

20 Claims, 14 Drawing Sheets

ELECTROMAGNETIC HEADS, FLEXURES, GIMBALS AND ACTUATORS FORMED ON AND FROM A WAFER SUBSTRATE

CROSS-REFERENCE TO RELATED APPLICATIONS

The present application claims the benefit under 35 U.S.C. §120 of (is a continuation of) U.S. patent application Ser. No. 11/880,605, filed Jul. 23, 2007, now U.S. Pat. No. 7,684,158, which claims the benefit under 35 U.S.C. §120 of (is a divisional of) U.S. patent application Ser. No. 09/912,723, filed Jul. 23, 2001, now U.S. Pat. No. 7,248,444, which claims the benefit under 35 U.S.C. §119(e) of Provisional Patent Application Ser. No. 60/219,994, filed Jul. 21, 2000, all of the above applications having the same inventor and the same title. The disclosures of each of the above applications are incorporated by reference herein.

TECHNICAL FIELD

The present invention relates to electromagnetic heads, gimbals and flexures for holding such heads, as well as to actuators that may be used for positioning such heads.

BACKGROUND OF THE INVENTION

Conventional electromagnetic heads such as those employed in disk or tape drives are formed in a plurality of thin films on a substrate, after which the substrate is cut or diced. In this manner a single wafer may yield many hundreds of heads. After formation, each head may then be attached to an arm for positioning the head adjacent the media. The arm may be attached to the head by flexure or gimbal elements, which allow the head to adjust relative to the media surface, compensating for imperfections in that surface or other dynamics.

Conventional disk drives have an actuator which positions a pair of such arms or load beams adjacent each spinning disk, the arms each holding a smaller flexure and gimbal that is mechanically connected to the head. Twisted wires have traditionally provided electrical connections between such heads and drive electronics, the wires held by tubes or crimps along the load beam and soldered to electrical bond pads on the head. Recently, so called wireless suspensions have been implemented, which use conductive leads that run along flexures and gimbals to provide signal communication with the head, although connections between the leads and conductive pads on the head are conventionally made by wire bonding. These wireless suspensions are typically laminated and include layers of stainless steel for strength, with conductors such as copper isolated by plastic or other dielectric materials.

The conductive traces still need to be bonded to pads on the head, but usually impart less mechanical uncertainty to the gimbal mechanism than twisted wires, and can be connected by machines for wire stitching. In order to reduce the size of such gimbals and flexures, U.S. Pat. No. 5,896,246 to Budde et al. proposes fabricating a magnetic head suspension assembly from a silicon structure using etching techniques. A similar idea is described in U.S. Pat. No. 5,724,015 to Tai et al., which appears to have resulted from an industry-government partnership exploring the fabrication of head suspensions from silicon parts.

U.S. Pat. No. 5,041,932 to Hamilton goes a step further, fabricating the entire head and flexure from thin films that are then lifted from the wafer on which they were formed. The resulting integrated head and flexure, which is generally plank-shaped, does not have a gimbal structure for conforming to the media, instead relying on ultralight mass and continuous contact for mechanical stability, durability and high resolution. The thin films of Hamilton's flexhead are formed in layers that are primarily parallel to the media surface, unlike most conventional disk heads, which are formed in layers that end up on a trailing end of the head, extending perpendicular to the media surface.

Recent years have witnessed dramatic growth in the use of magnetoresistive (MR) sensors for heads, which sense magnetic fields from a disk or tape by measuring changes in electrical resistance of the sensors. Care is usually taken to avoid sensor contact with a rapidly spinning rigid disk, as such contact may destroy the sensor or create false signal readings. In order to increase resolution, however, current production heads may fly at a height of one micro-inch from the disk surface. MR sensors are typically formed along with inductive write transducers in thin films on a wafer substrate. After formation, the wafer is diced into sliders each having thin film inductive and MR transducers on a trailing end, the sliders' length determined by the wafer thickness.

As heads become smaller, connection of even modern wireless suspensions becomes difficult and may add undesirable mechanical complexities to the gimbal area. Moreover, MR sensors can be delicate and require at least two extra leads that must be connected to the drive electronics, adding to connection difficulties. Additionally, as heads are required to fly closer to the media and provide quicker access time to various tracks on the disk, mechanical challenges increase.

Further, as a means for increasing the density at which bits are stored on a media surface, the spacing between adjacent recording tracks and the width of each track may be reduced to a level not accurately accessible with conventional actuators. As a result, a number of designs for dual actuators have been proposed, typically including a conventional rotary actuator for large-scale positioning and a microactuator disposed nearer the head for small-scale positioning. Some of these proposed microactuators, however, interfere with flexure and gimbal mechanics, such as devices that rotate a head relative to an attached flexure. Other proposed microactuators introduce other errors, for example by using mechanical pins or other mechanisms for pivoting.

SUMMARY OF THE INVENTION

In accordance with the present invention integrated head, flexure, gimbal and/or actuator devices formed on and from a wafer substrate are disclosed. Conventional problems of connecting the head to the flexure and/or gimbal are reduced or eliminated, as all of these elements may be made on and from the same wafer on which the transducer is formed. The transducer layers may be oriented generally perpendicular to the media surface, affording employment of the most proven high-resolution transducer designs. Electrical leads may also be formed on the integrated flexure and/or gimbal in contact with leads of the head. Additionally, a microactuator may be formed on an end of the structure furthest from the transducer layers, providing a relatively simple mechanism for greatly increasing the accuracy with which the transducer is positioned adjacent media tracks and increasing track density.

Heads formed in accordance with the present invention can be made thinner and do not need a large area on the trailing surface for bonding pads, reducing their mass and moment arms. The gimbals and flexures can be more closely aligned with forces arising from interaction of the head with the disk surface and from seeking various tracks, reducing torque and dynamic instabilities. Alignment of a plane of the flexures between the actuator and the head greatly reduces low frequency vibrations due to actuation, as motion induced by the actuator is confined to a stiff in-plane direction as opposed to a flexible out-of-plane direction of the flexures. Spacing between disks can be reduced due to the thinner heads and lower profile gimbals and flexures. The heads may be operated in continuous or intermittent operational contact with the media, or may be designed to avoid such contact during operation. This brief summary merely lists a few possible features of the invention, which is described in more detail below.

DETAILED DESCRIPTION OF THE PREFERRED EMBODIMENTS

Figure 1:
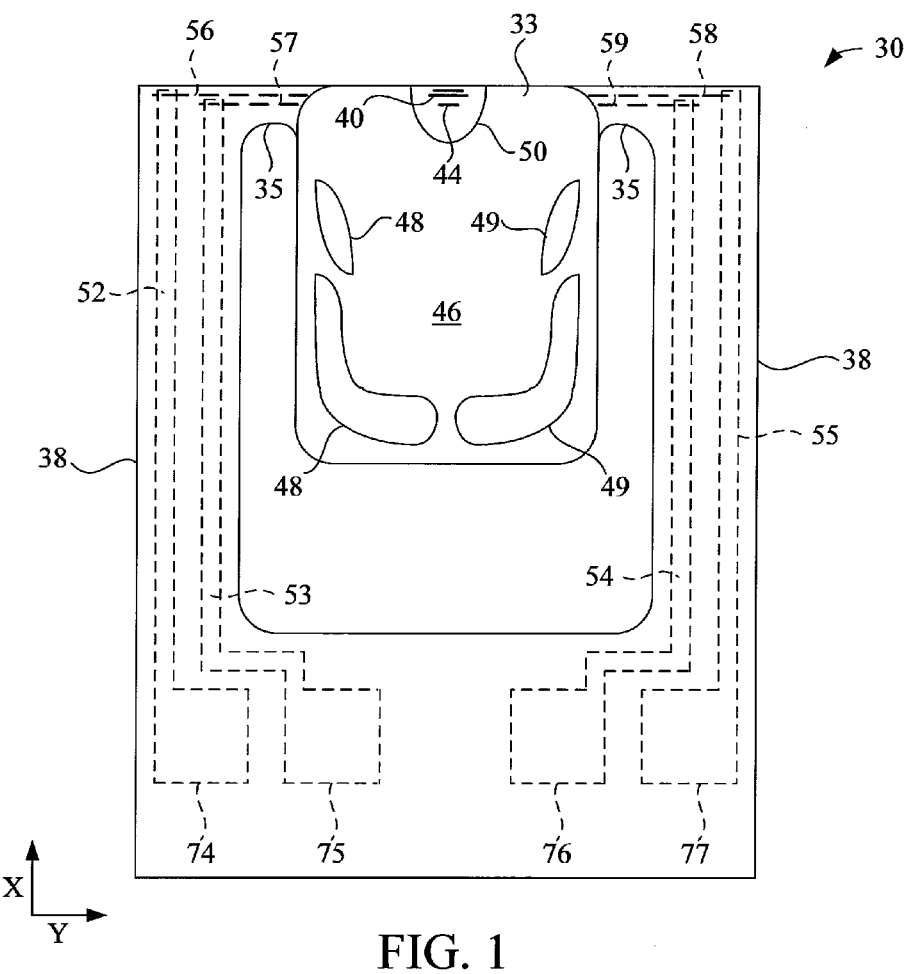
FIG. 1 is a view of a media-facing side of a device of the present invention including an integrated head, gimbal and flexure.

FIG. 1 shows a media-facing side of a device 30 of the present invention including an integrated head 33, gimbal 35 and flexure 38. The head 33 includes an inductive transducer 40 and a magnetoresistive (MR) transducer 44, although other types of transducers may alternatively be employed. As will be explained in greater detail below, the transducers 40 and 44 are formed along with many other similar transducers on a wafer substrate, after which the wafer is cut into rows each containing a number the transducers, and the rows are then processed from another direction to form the integrated head 33, gimbal 35 and flexure 38.

A media-facing surface 46 of the head 33 includes rails 48 and 49 and a transducer-containing pad 50 that are designed to be closer than the remainder of the media-facing surface to the media during operation. The rails 48 and 49 and pad 50 may project about a micron or less from the remainder of the bearing surface 46. The gimbal 35 and flexure 38 are much thinner than the head, in order to increase flexibility of the gimbal and flexure. The gimbal 35 and flexure 38 may also be disposed further from the media than the media-facing surface 46 of the head 33, in order to remove them from interactions with the media or gases or liquids that travel with the media.

Figure 2:
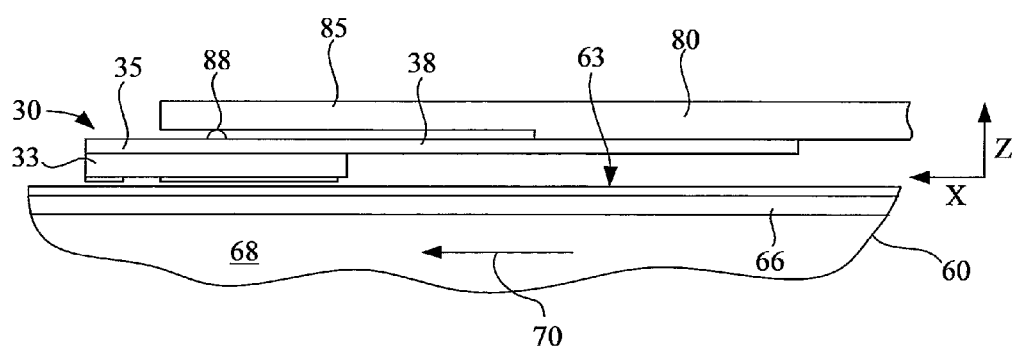
FIG. 2 is a side view of the device of FIG. 1 interacting with a medium such as a rigid disk.

FIG. 2 shows a side view of the device 30 interacting with a media 60 such as a rigid disk, a cross-section of which is shown. The media 60 has a surface 63 and a media layer 66 formed over a substrate 68, and is travelling relative to the head 33 in a direction indicated by arrow 70. The head 33 may have a thickness in a direction perpendicular to the media surface 63 that is on the order of 100 µm, whereas the gimbal 35 and flexure 38 may have a thickness of only 5 µm-50 µm in that direction. For clarity, the direction perpendicular to the media surface is defined as the Z-direction, whereas a direction perpendicular to the Z-direction and substantially aligned with the direction of media travel is defined as the X-direction, while a direction orthogonal to the X and Z-directions is defined as the Y-direction. As is conventional in the disk drive industry, a distance measured along the Z-direction away from the media may be referred to as a Z-height.

The gimbal 35 and flexure 38 are much closer in height to the center of mass of the head 33 than is conventional, reducing dynamic instabilities that otherwise can occur during track seeking and settling, and therefore reducing access times. This alignment of suspension height and head mass is due in part to having the top surface of the flexure aligned with the top surface of the head, whereas conventional suspensions have their bottom surface located above the top of the head and tapering down to meet the head top surface at bond areas. Also, the head of the present invention can be reduced in height, since large areas on the back of the slider are not needed for providing conductive connections with the suspension. Having a relatively low gimbal 35 and flexure 38 also helps to align those suspension members with forces generated by interaction with the disk 60, whether due to contact or near contact. This helps to achieve lower flying heights and avoids crashes that may otherwise occur due to wobbling sliders whose corners plow into the disk.

Referring additionally to FIG. 1, a plurality of conductive leads 52, 53, 54 and 55 are disposed in the flexures 38, connected with transducer leads 56, 57, 58 and 59 disposed in gimbal elements 35. As will be explained in more detail below, transducer leads 56, 57, 58 and 59 can be defined during formation of transducers on a wafer to provide guidance during row bar processing for the formation of gimbals 35 and flexures 38 of a desired thickness. Conductive bond pads 74, 75, 76 and 77 provide connections for device 30 with a load beam 80. Load beam 80, which may be made of conductive and insulative laminates, has an extending tongue 85 that may include a dimple that provides a fulcrum for head 33, and tongue may extend past the head in the X-direction, although not shown in FIG. 2. Such a dimple may be formed by pressing, for the situation in which the tongue 85 contains stainless steel, for instance, or by deposition and/or patterning for the situation in which the tongue 85 is formed by similar deposition and/or patterning. Alternatively, a protrusion 88 may be formed on a back surface of the head 33, for example by deposition or by etching of other portions of that back surface, as described below.

Figure 3:
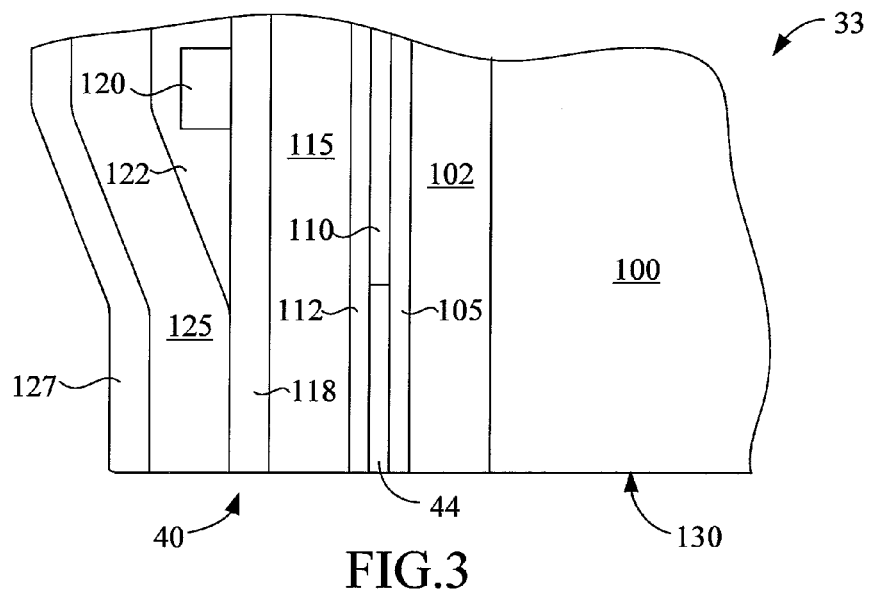
FIG. 3 illustrates some initial steps in forming the head of FIG. 1.
Figure 4:
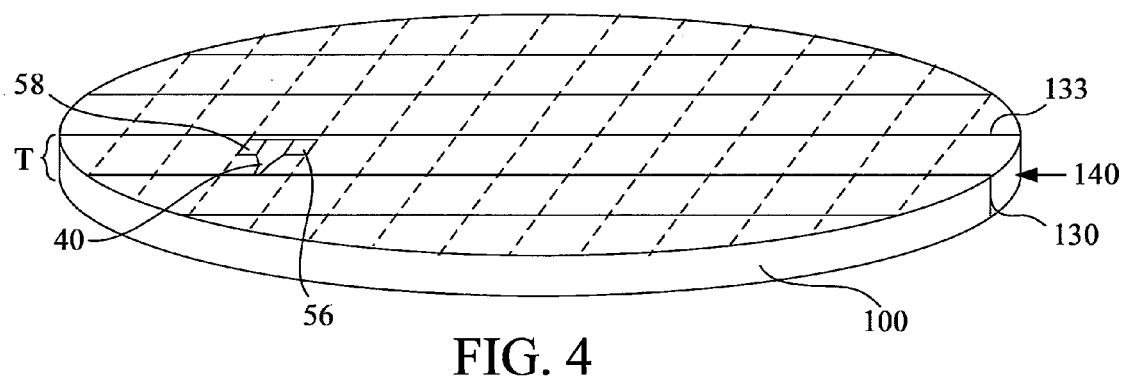
FIG. 4 shows the partially formed head of FIG. 3 during formation on a wafer substrate.

In FIG. 3 some initial steps in forming the head 33 are shown. The head 33 is formed on a wafer substrate 100, also shown in FIG. 4, that may be made of alumina ($Al_2O_3$), alumina titanium carbide ($Al_2O_3$—TiC), silicon (Si), silicon dioxide ($SiO_2$), silicon carbide (SiC) or other known materials, the head being mass-produced along with hundreds or thousands of other heads. Substrates containing silicon may be preferred for their ability to be deeply, quickly and controllably etched. Also, as described below, transistors may be formed on the substrate adjacent transducers 40 and 44 for signal amplification, for which silicon may be advantageous. The dimensions of the head, flexure and gimbal elements are determined based upon known characteristics of the materials forming the substrate and film layers. Note that etching or other removal processes used for patterning the head, flexure and gimbal elements are controllable in three dimensions rather than two, affording design flexibility.

After polishing and preparing a surface of the wafer substrate 100, a first magnetically permeable layer 102 is formed of a material such as Permalloy (NiFe), which will function as a magnetic shield. A first read gap layer 105 of a nonmagnetic, electrically insulating material such as alumina, silicon dioxide or diamond-like carbon is then formed, on top of which the magnetoresistive (MR) sensor 44 is formed. The MR sensor 44 may be an anisotropic magnetoresistive (AMR) sensor, spin valve (SV) sensor, giant magnetoresistive (GMR) sensor, spin tunneling (SP) sensor or other known sensors, the details of which are known in the art and omitted here for conciseness. After the MR sensor 44 has been formed the leads 57 and 59, shown in FIG. 1, are defined. A back gap 110 and second read gap 112 of electrically insulating, nonmagnetic materials such as alumina, silicon dioxide or diamond-like carbon are also formed.

A first pole layer 115 of magnetically permeable material such as permalloy is then formed for transducer 40, layer 115 also serving as a shield for the MR sensor 44 in this example of a merged head. Note that in other embodiments greater separation of the MR transducer 44 and the inductive transducer 40 may be desirable. A nonmagnetic, electrically insulating write gap 118 of material such as alumina, silicon dioxide or diamond-like carbon is formed on the pole layer, and a conductive coil 120 is formed on the write gap 118, the coil surrounded by nonmagnetic, electrically insulating material 122 such as baked photoresist. Conductive leads 56 and 58 connect with the coil 120 to provide current for inducing a magnetic flux across recording gap 118, the leads also helping to define dimensions for the gimbal, as will be shown below. A second pole layer 125 of magnetically permeable material is then formed, and a protective coating 127 of alumina, DLC or other materials is conventionally formed. The protective coating may be formed to a thickness allowing gimbals 35 that are subsequently defined to contain only thin film materials. Other known transducers may be formed instead of the above example of a merged head.

Figure 5:
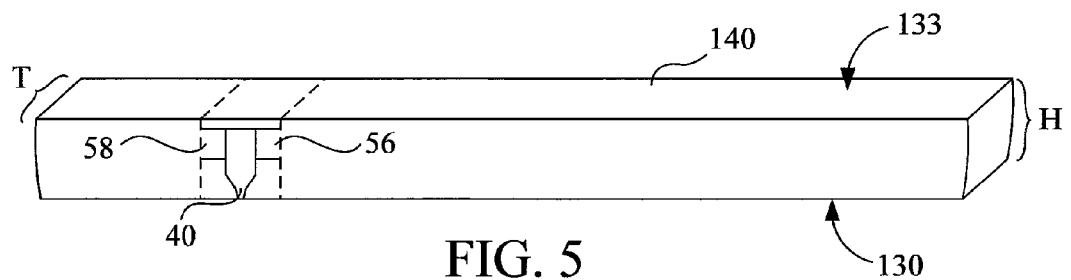
FIG. 5 shows a row cut from the substrate of FIG. 4, the row including the head of FIG. 3.

The substrate and thin film layers are then cut along a number of lines such as lines 130 and 133, forming for example one hundred rows of heads from a single wafer 100. FIG. 5 shows row 140 cut from the substrate 100, with the recently formed inductive transducer 40 and leads 56 and 58 visible through the transparent protective coating. The wafer 100 thickness T will determine the length of the integrated head and flexure 30 of row 140 and all other rows. Processing of row 140 then occurs on surfaces 130 and 133, both of which may be lapped to thin and smooth the head and flexure 30. Surface 130 is lapped while resistive leads are monitored to obtain a desired height of transducers 40 and 44. The polished row 140 has a height H which may be about 100 microns in this example, but which may be tailored to significantly different heights depending upon desired implementations. After lapping, surfaces 130 and 133 are masked and etched to form the desired media-facing surface, head, gimbal and flexure that are depicted in FIG. 1.

Figure 6:
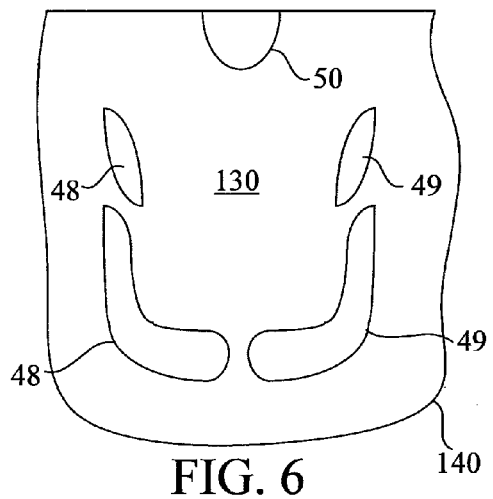
FIG. 6 shows the formation of air bearing rails and pads of the media-facing surface of the head of FIG. 1.
Figure 7:
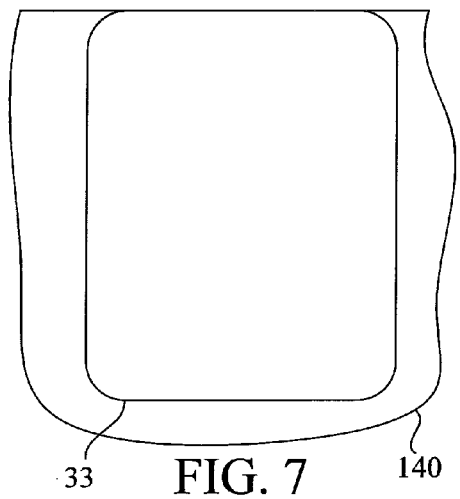
FIG. 7 shows the masking of the head of FIG. 1 during material removal that shapes the media-facing side of the gimbal and flexure of FIG. 1.

As shown in FIG. 6, all of surface 130 is exposed to etching, preferably by ion beam etching (IBE) or reactive ion etching (RIE), except for photoresist or other masking that covers rails 48 and 49 and pad 50, while rails and pads of other heads of row 140 are covered by similar masks, not shown. After the rails 48 and 49 and pad 50 have been formed, which project from the rest of the media-facing surface of the head on the order of a micron, a thick mask is formed over the head 33 and other heads of the row 140, as shown in FIG. 7.

A multimicron, highly anisotropic etch is then performed that removes the suspension flexure and gimbal from the media-facing surface of the head 33. This etch, preferably performed by RIE, removes a substantial fraction of the row 140 height H between surfaces 130 and 133, except in the area of the head 33 which is covered by the thick mask. As known in the art of MicroElectroMechanical Systems (MEMS) such etching can have high aspect ratios of perpendicular versus lateral etching, so that tens of microns of etching in the Z-direction may be accomplished with less than one micron of etching in the X-direction or Y-direction. Exact control of the depth of etching in the Z-direction may be accomplished by timing or by monitoring the etching process for evidence of conductors 56 and 58, which have been formed to a distance predetermined to serve as an etch-stop signal. A protective coating of diamond-like carbon (DLC), tetrahedral amorphous carbon (ta-C), silicon carbide (SiC) or the like may then be formed on the rails 48, 49, pad 50, gimbal 35 and flexure 38. For the situation in which such a protective coating was formed over the media-facing surface prior to defining pads 48, 49 and 50, the head 33 may not be coated again.

Figure 8:
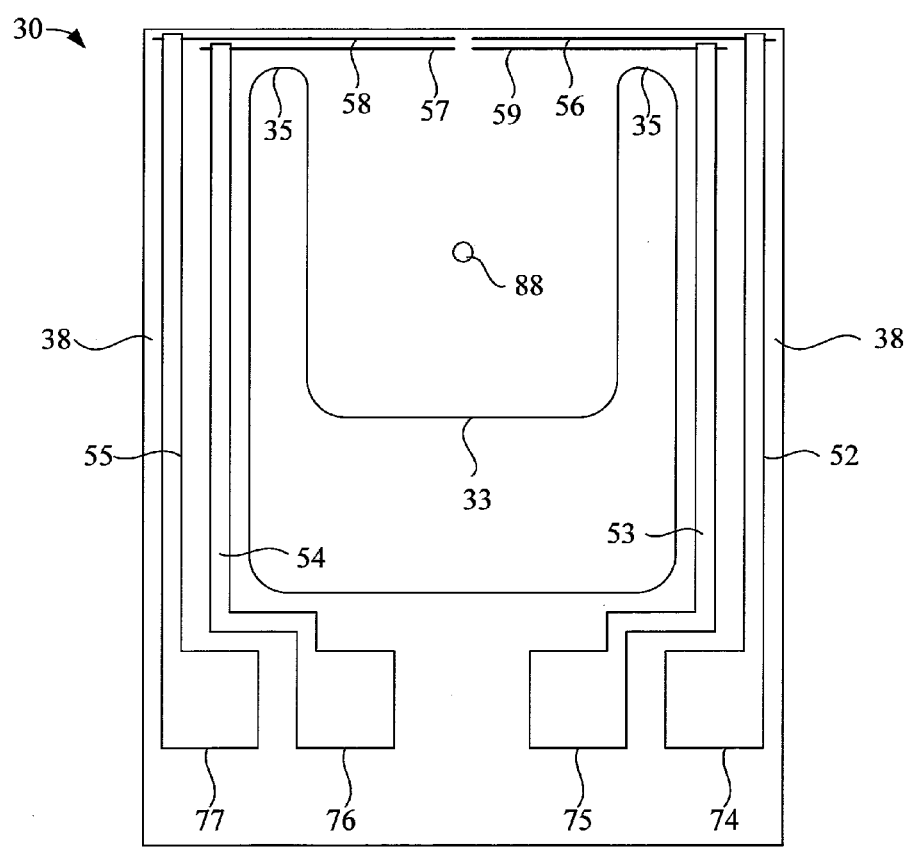
FIG. 8 shows the formation of a non-media-facing side of the device of FIG. 1.

The row 140 is then turned over to work on surface 133, which will become a back surface, as shown in FIG. 8. If conductors 56-59 have not already been exposed by lapping of this surface, etching can be performed until evidence of these conductors occurs, determining height H with precision. Conductors 56-59 or other marks created during formation of transducer layers can also be used as guides for precisely aligning the features on both sides of the row 140. The protrusion 88 that will serve as a fulcrum for the head 33 can be formed at this time by masking an area over the protrusion and etching away other areas of the back surface of the head. Sloping sides of the protrusion 88 can be formed by rotating IBE or other forms of at least somewhat isotropic etching know in the art of magnetic head fabrication. Alternatively, the protrusion 88 may be formed by deposition of material such as ceramic or metal that matches the material of the head or tongue 85, or by deposition of extremely hard materials such as DLC, SiC or ta-C.

The head 33, flexures 38 and gimbals 35 are then covered with a thick mask, and a multi-micron perpendicular etch is performed on row 140 that defines a U-shaped aperture between those elements. Conductors 52-55 and pads 74-77 are then formed, for example of gold (Au), copper (Cu), beryllium copper (BeCu) or aluminum (Al). A protective insulative coating is then formed, except over pads 74-77. Individual device 30 may be severed from other devices at this point by cutting or further etching.

The device 30 may be connected to the load beam 80 by various methods. Epoxy bonding can be used for mechanical connection, for example, while wire bonding or stitching can provide electrical connections between pads 74-77 and electrical leads formed on a non-media-facing side of the load beam. Alternatively, ultrasonic bonding may be used to connect pads 74-77 with electrical leads formed on a media-facing side of the load beam. Distancing such bonding from the head and gimbal area removes mechanical uncertainties and complexities from the most sensitive area of device 30, in contrast with conventional head and gimbal connection mechanisms.

Figure 9:
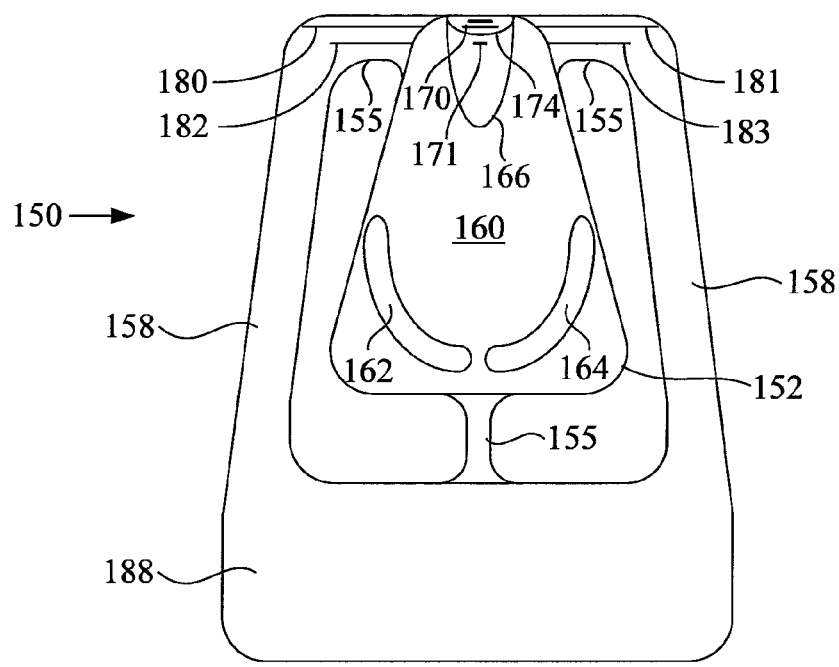
FIG. 9 shows a disk-facing side of another embodiment of the present invention.

FIG. 9 shows a disk-facing side of another embodiment of the present invention, in which a device 150 including a head 152, gimbal elements 155 and flexures 158 may be formed from less wafer real estate than that used for a conventional pico-slider. The head 152 has a generally triangular disk facing surface 160 with rails 162 and 164 and pad 166 projecting slightly. An inductive transducer 170 and a MR transducer 171 are visible through a transparent protective coating on pad 166, with the inductive transducer disposed in a slightly projecting area 174 compared to the MR transducer. This slight difference in elevation between the inductive transducer 170 and the MR transducer 171, which may be on the order of 100 Å, allows the former to write at high resolution while the latter avoids thermal asperities and wear that may otherwise be caused by operational contact with the disk. Conductive leads 180 and 181 connect with the inductive transducer 170 while leads 182 and 183 connect with the MR transducer 171, the leads formed along with the transducers and exposed during etching of the gimbal elements 155, the exposure signaling completion of etching the gimbal elements. A base 188 is formed to provide mechanical and electrical connections for the device.

Figure 10:
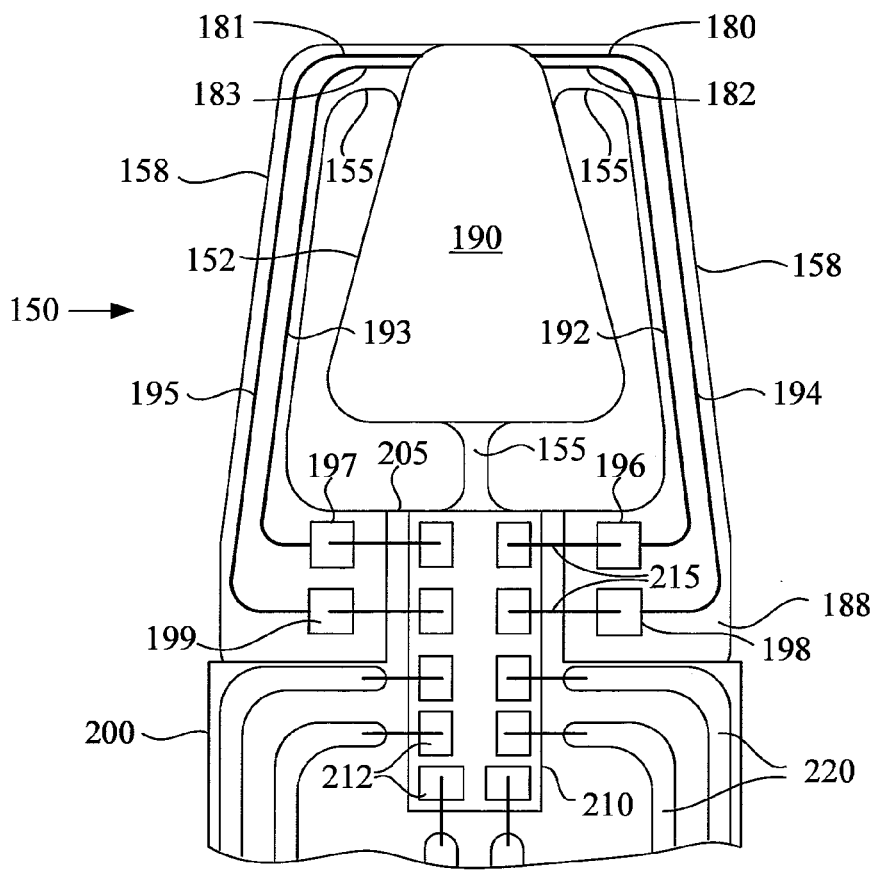
FIG. 10 shows an opposite side from that shown in FIG. 9, including an amplifier attached to a load beam and connected with leads disposed on the flexure and gimbal that are connected with the head.
Figure 11:
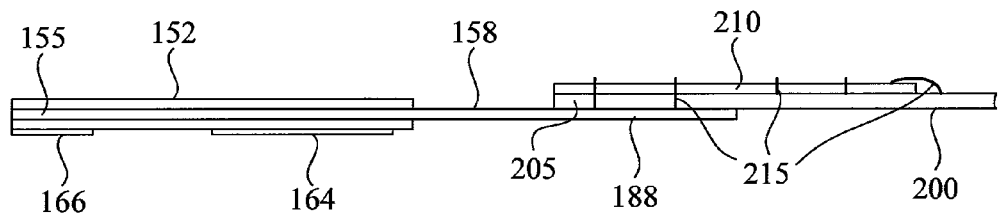
FIG. 11 is a side view of the suspension elements of FIG. 9, illustrating a flexure located close in Z-height to the center of mass of the head.

FIG. 10 shows a non-disk-facing side of device 150, connected to a load beam 200. The gimbal 155 and flexure 158 elements have also been etched or ablated from this side to the point at which conductors 180-183 are exposed, so that those suspension elements are not coplanar with a non-disk-facing 190 surface of the head 152. As can be seen in FIG. 11, this allows the suspension elements including flexure 158 to be located closer in height to the center of mass of the head 152. Aligning the height of suspension elements closer to the center of mass of the head reduces torque that would otherwise occur during rapid movement of the head from one disk track to another, during which time the head experiences extreme acceleration and deceleration. As described above, a protrusion that can act as a fulcrum may optionally be formed on surface 190.

Conductive leads 192 and 193 are formed along flexures 158 connecting inductive transducer leads 182 and 183 with pads 196 and 197, respectively. Similarly, conductive leads 194 and 195 are formed along flexures 158 connecting MR transducer leads 180 and 181 with pads 198 and 199, respectively. After masking the head 152, gimbal 155, flexure 158 and base 188, the non-disk-facing side is etched or ablated again to create voids and separate device 150 from adjacent devices.

Device 150 is then connected to load beam 200, which has short tongue 205 that bonds with a central portion of base 188, as shown additionally in FIG. 11. An amplifier chip 210 is attached to the beam 200 and extends onto the tongue, the chip having a number of bond pads 212. Bond pads 196-199 of the device are connected to bond pads 212 of the chip, for example by wires 215.

Figure 12:
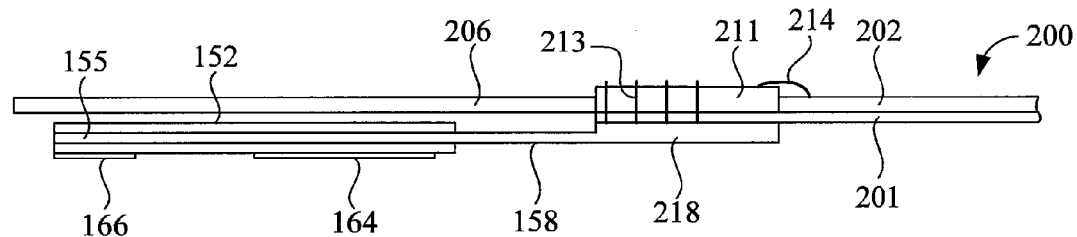
FIG. 12 is a side view similar to that of FIG. 11 but with a load beam having a tongue that extends over the head.

In FIG. 12, load beam 200 is made of layers 201 and 202, with layer 201 having a tongue 206 that extends over head 152 to provide protection and a shock-absorbing backstop for the head in the event of a shock to the drive. An amplifier chip 211 is attached to layer 201 on one side of tongue 206, layer 201 being attached to a pedestal 218 of device 150. A similar chip may be attached on the same side of another arm sharing the space between disks, not shown, so that the chips are offset and avoid each other. Wires 213 and 214 provide electrical connections between chip 211 and leads on the device 150 and beam 200, respectively.

Figure 13:
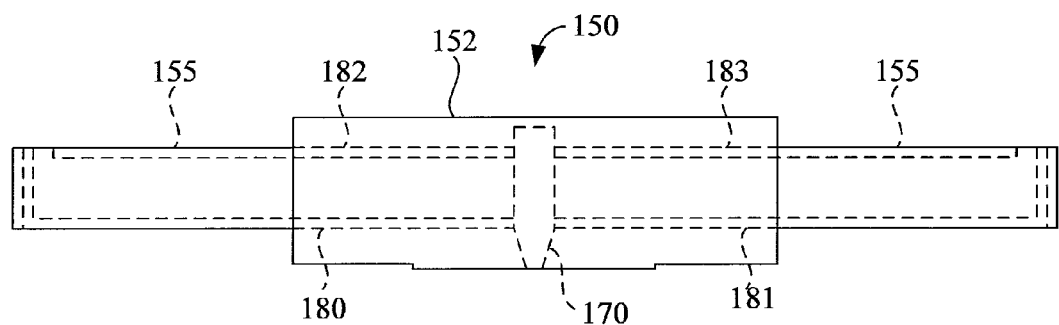
FIG. 13 is view of a trailing end of the device of FIG. 9.

As shown in FIG. 13, conductive leads need not span the gimbals in the Z-direction in order to define etch stops for the gimbals. For instance, MR transducer leads 182 and 183 can define an etch stop for the non-disk-facing side of the gimbals 155 while inductive transducer leads 180 and 181 can define an etch stop for the disk-facing side of the gimbals, with a connector leading to the non-disk-facing side. Timing can be employed to control the extent of etching in addition to or instead of monitoring for etch stop materials.

Figure 14:
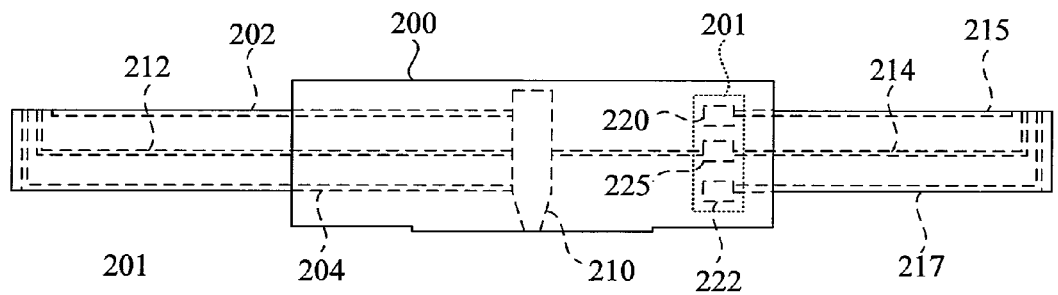
FIG. 14 is view of a trailing end of the device of FIG. 9, including an amplifier formed on the head.

Beginning with FIG. 14, a head 200 is illustrated that includes a transistor amplifier 201 formed adjacent to the read and write transducers. A pair of write leads 202 and 204 are connected to a coil, not shown, of an inductive transducer 210. A pair of sense leads 212 and 214 are connected to a MR transducer, which is disposed behind the inductive transducer and therefore not shown in this figure for clarity. Amplifier leads 215 and 217 extend adjacent to sense lead 214, and terminate at source electrode 220 and drain electrode 222, respectively. Sense lead 214 is connected to a gate electrode 225 that is disposed over a semiconductor region forming a gate for transistor 201. Source electrode 220 and drain electrode 222 are disposed over source and drain regions having opposite conductivity type to that of the gate. A mechanism such as a resistor is disposed in series with lead 214 distal to the MR transducer and optionally on the head, so that changing resistance in the MR transducer responsive to a signal from the media changes the voltage on gate electrode 215. This change in voltage on the gate electrode may be amplified on the order of 100 times in the amplifier leads. Note that this simple example of a single transistor 201 may be supplanted by a CMOS transistor, known amplifier and/or detector circuits. Examples of detector circuits that may be formed on the head are described in U.S. Pat. Nos. 5,546,027, 5,430,768 and 5,917,859, incorporated by reference herein, for which some electronics such as clock generators may be provided separately, for instance adjacent the load beam or actuator. Perhaps one thousand square microns of chip real estate may be available on the trailing edge of head 200 for formation of amplifier and/or detector circuits.

Figure 15:
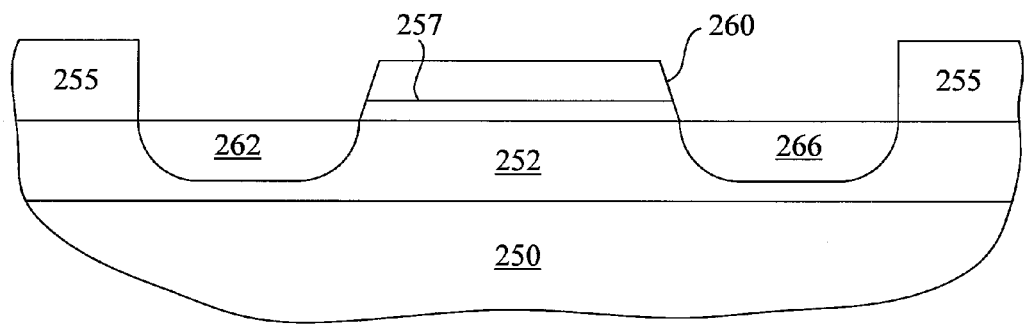
FIG. 15 is a cross-sectional view of an initial stage in forming the amplifier of the head of FIG. 14.

FIG. 15 shows some initial steps in the formation of the head of FIG. 14. On a preferably silicon wafer substrate 250 that will eventually be patterned to form a head and flexure, a P-type semiconductor layer 252 is formed. In an alternate embodiment the wafer may be doped P-type or N-type and layer 252 need not be formed, as known in the art of integrated circuit fabrication. An oxide layer 255 is grown on semiconductor layer 252, masked and etched, leaving an area of the P-type layer 252 upon which a gate oxide layer 257 is formed. A doped polysilicon gate 260 is formed atop gate oxide 257 and both are trimmed to leave areas for N-type, self-aligned source 262 and drain 266 to be formed by ion implantation. The wafer may after ion implantation be annealed at temperatures exceeding 500° C., as known in the art of circuit fabrication.

Figure 16:
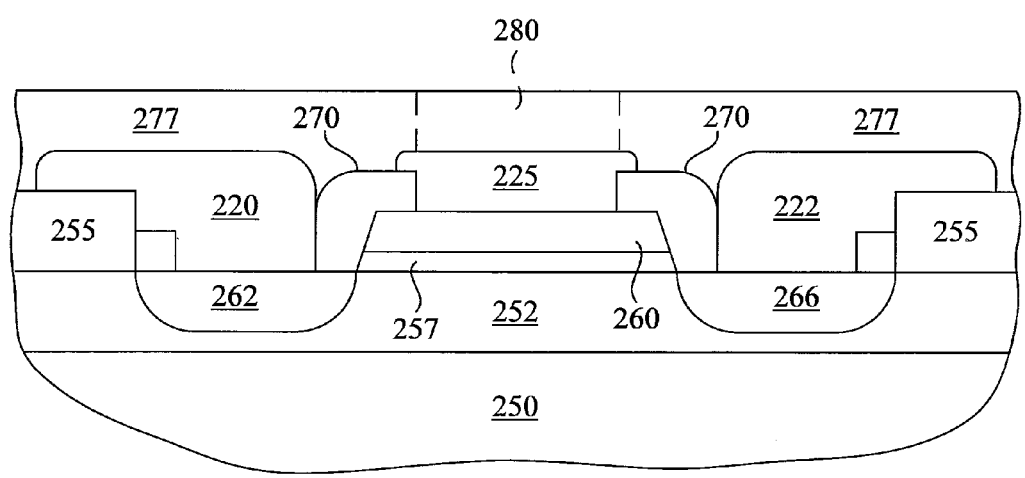
FIG. 16 is a cross-sectional view of the amplifier of the head of FIG. 14, prior to the formation of a transducer on the head.

In FIG. 16, another oxide layer has been formed, masked and etched to create dielectric regions 270, leaving gate 260, source 262 and drain 266 exposed, upon which gate electrode 225, source electrode 220 and drain electrode 222 are respectively formed. Another dielectric layer 277 is then formed, for example of $SiO_2$, creating a smooth planar surface for subsequent formation of a magnetic shield layer, not shown in this figure. A via may be etched in this layer 277, the via then being filled with conductive material to form an electrical interconnect 280 between gate electrode 225 and sense lead 214. Additional interconnects may be stacked on interconnect 280 to complete a conductive path to sense lead 214 through a dielectric layer formed adjacent the first shield and first read gap layer. Note that the preceding description of a most basic transistor amplifier can be extrapolated to the formation of much more complicated circuits, any of which may be included in a head of the present invention.

Figure 17:
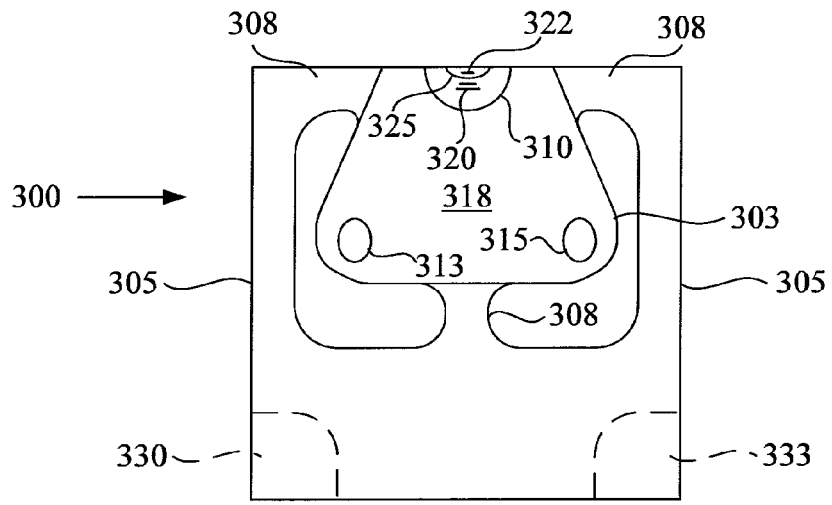
FIG. 17 is a media-facing side of a media-contacting embodiment of the present invention including an integrated head, gimbal and flexure.

FIG. 17 shows a transducing device 300 including a head 303 integrated with flexure 305 and gimbal 308 elements. The device 300 has been formed on and patterned from a ceramic substrate such as a silicon wafer, much as described above. The head 303 has a media-facing surface with three projections, pads 310, 313 and 315, which are designed for contact or near contact with a rapidly moving media surface such as that of a rigid disk. Since head 303 does not have large air bearing surfaces such as rails, the head can be very small and light, so that the device 300 may be significantly smaller than a pico-slider. The pads 310, 313 and 315 may project from a recessed area 318 of the media-facing surface by between about a micron and ten microns, and are preferably coated with an extremely hard, wear resistant coating such as DLC, ta-C or SiC. An inductive transducer 320 has poletips terminating on or adjacent an exposed surface of pad 310 for close proximity to the media, so that sharp and strong magnetic patterns can be written on the media. A MR or GMR transducer 322 terminates adjacent to a recessed portion 325 of pad 310 that avoids contact with the media even when the remainder of pad 310 contacts the media, so that a read transducer 322 such as a MR or GMR sensor avoids wear and thermal asperities, as described in U.S. Pat. No. 5,909,340, incorporated by reference herein.

The flexure 305 and gimbal 308 may have a non-media-facing surface that is generally coplanar with a non-media-facing surface of the head, simplifying removal of material from the non-media-facing side. The flexure 305 and gimbal 308 may instead have a media-facing surface that is generally coplanar with the recessed area 318 of the head, in order to align the flexure and gimbal with dynamic forces of the head/media interface. The head 303 may contain amplifier circuitry, and conductive leads may be formed along the non-media-facing sides of flexure 305 and gimbal 308 elements, as described above.

Figure 18:
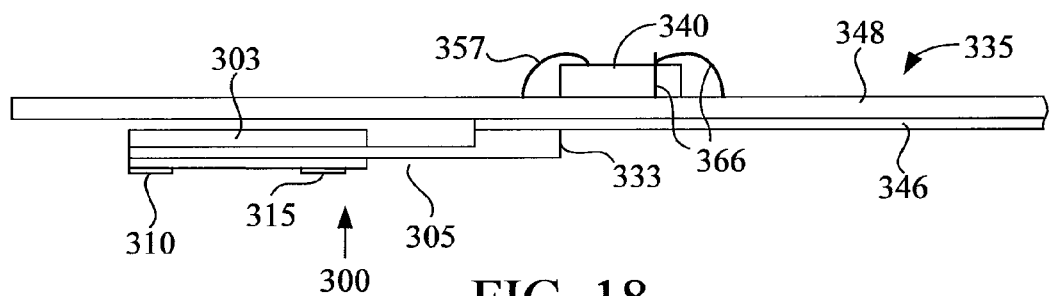
FIG. 18 is a side view of the embodiment of FIG. 17 attached to a load beam that extends over the head and holds an amplifier.

Alternatively, as shown in FIG. 18, the flexure 305 and gimbal 308 may have a different Z-height than both major surfaces of the head, so that the flexure and gimbal are flexible in the Z-direction as well as aligned with the Z-height of the center of mass of the head, reducing torque during seek and settle operations. The device in this example has a pair of pedestals 330 and 333 that have a similar Z-height as the surface of the head 303 facing away from the media, the pedestals being attached to a laminated load beam 335, which may contain stainless steel for strength and convenience. Instead of forming separate pedestals for bonding to the load beam, the device may have a continuous plateau distal to the transducers for attachment to the load beam. An amplifier chip 340 is disposed on the load beam and electrically connected to the device and beam by wires 342 and 344, respectively. The load beam includes a lower layer 346 that is bonded to pedestals 330 and 333, and an upper layer 348 that extends over the head 303 in a loop 350, as seen in the top view of FIG. 19.

Figure 19:
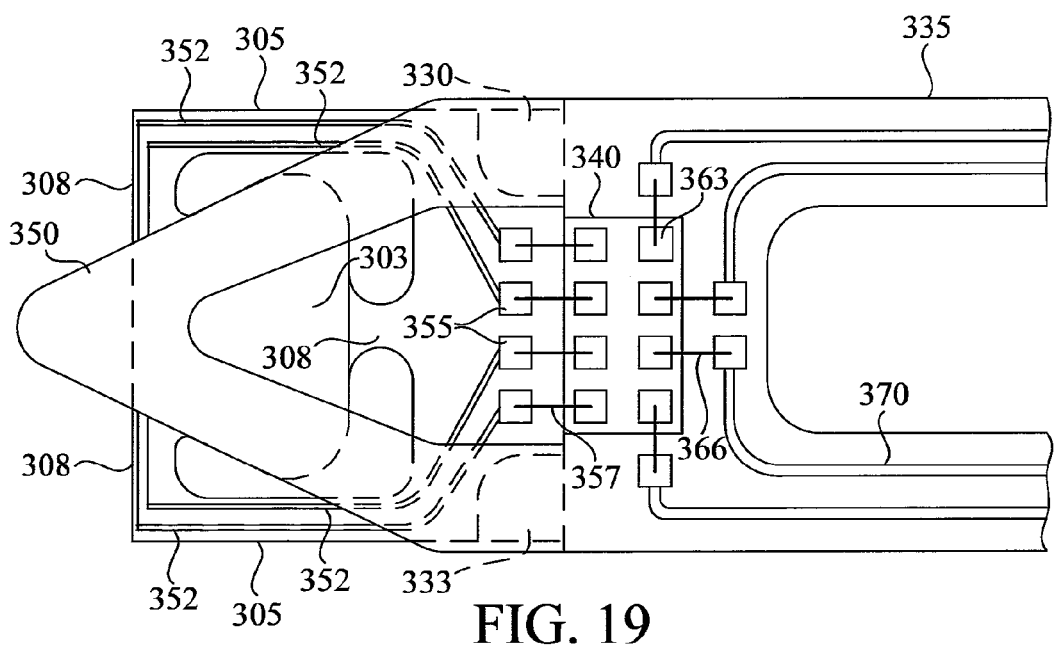
FIG. 19 is a top view of the head, flexure and beam of FIG. 18, with the amplifier connected with leads disposed on the flexure and gimbal that are connected with the head.

Also apparent in FIG. 19 are a plurality of electrical conductors 352 leading between the head and a corresponding plurality of contact pads 355 disposed on device 300 near pedestals 330 and 333. Wires 357 connect pads 355 with input/output pads 360 on chip 340. Additional input/output pads 363 on chip 340 are connected by other wires 366 to electrical conductors 370 disposed on load beam 335 and leading to drive circuitry, not shown. More or less pads and conductors may be employed depending upon the desired implementation, and conductors 370 are separated from conductive material of the load beam 335 by dielectric material, or load beam may be dielectric.

Figure 20:
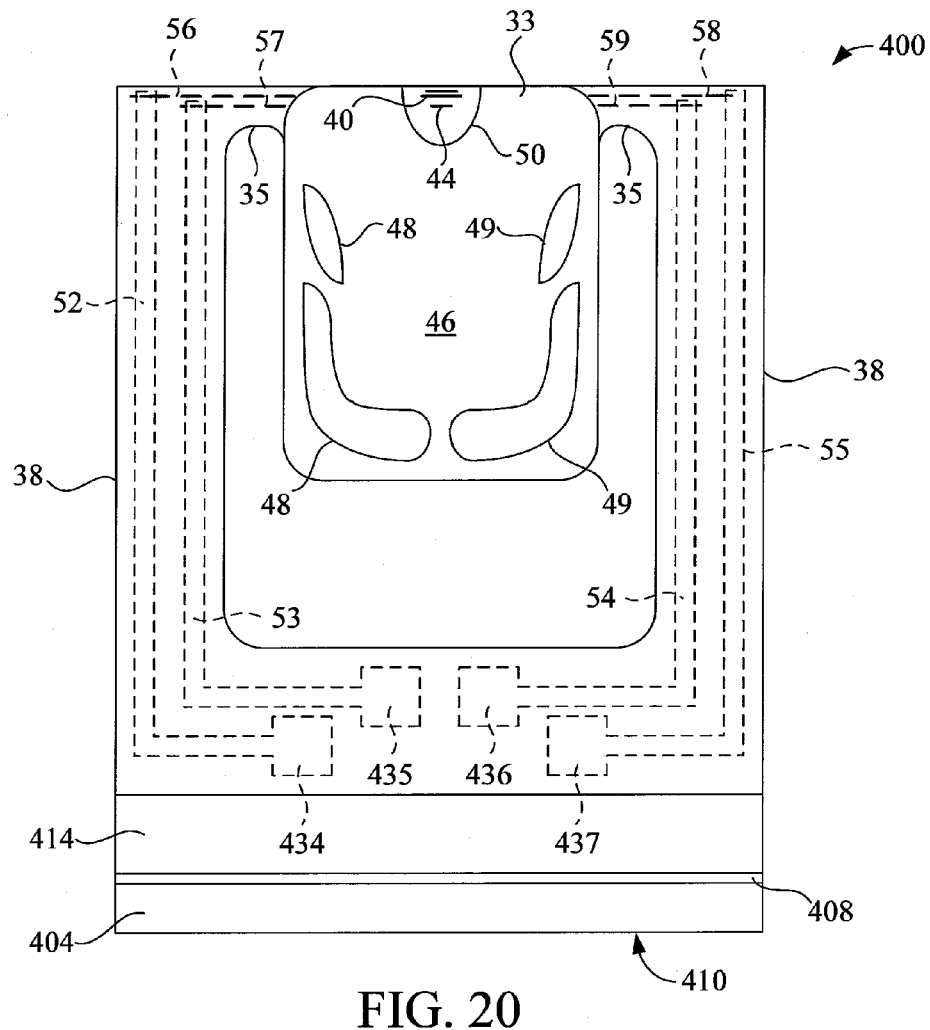
FIG. 20 is a view of media-facing side of a device of the present invention including an integrated head, gimbal, flexure and actuator having a common electrode.

FIG. 20 shows a device 400 including a piezoelectric layer 404 that may be employed to help position the device. Much of device 400 is like device 30 shown in FIG. 1, and so for brevity substantially similar elements will not be renumbered or discussed at this point. Much as above, device 400 is formed on and from a wafer substrate, but prior to formation of head elements on a major surface of the wafer, a conductive layer 408 is formed on a major surface of the wafer. The conductive layer 408 may be formed of a metal or conductive ceramic that adheres well to the wafer and to the piezoelectric layer 404 that is formed atop the conductive layer. The piezoelectric layer 404 may be made of lead zirconium titanate (PZT) or other solid materials known to change shape in response to an electric field, a phenomenon known as electrostriction or the inverse piezoelectric effect, including ceramics such as barium titanate, many of which have a perovskite crystalline structure. Dielectrics such as alumina or silicon dioxide also exhibit a small amount of electrostriction, which may be sufficient to form actuators for certain applications, particularly if multiple thin (typically submicron layers are sandwiched between electrodes. For the situation in which the piezoelectric layer 404 is made of PZT, layer 404 may have a thickness in a range between less than a micron and more than ten microns, depending in part on the amount of positioning desired to be accomplished with the layer 404 and the voltage available to control that positioning.

For the case in which a material such as PZT is used to form layer 404, applying heat and an electric field may control the direction of the electrostrictive expansion or contraction of that layer during operation in response to an electric field. For example, the wafer and layers 404 and 408 may be heated to an elevated temperature, such as 700° C. to over 1000° C., with an electric field provided between layer 408, which serves as a first electrode, and a second electrode held adjacent a surface 410 of the piezoelectric layer 404, which may also provide heat for the annealing. An isolation layer may be provided on layer 404 to allow separation of the second electrode after annealing. Heat for annealing may optionally be provided by initially supplying an alternating electric field between the first and second electrodes. After cooling and cleaning the wafer, the head elements are formed on an opposite surface of the wafer from layer 404, followed by separating the wafer into rows and working the rows to create the media-facing surfaces, heads, flexures and leads, much as described above.

Figure 21:
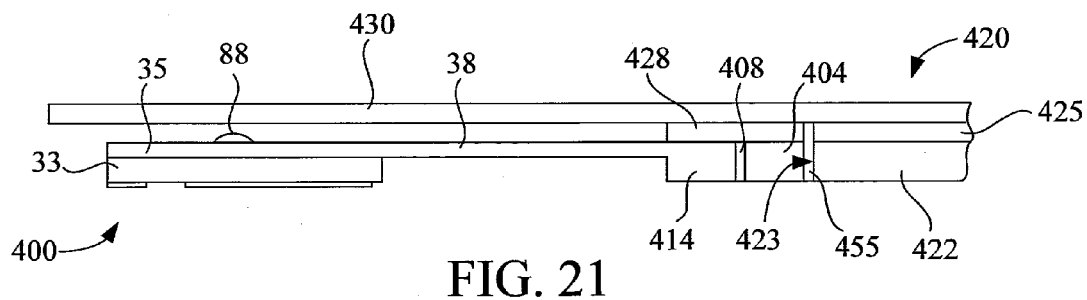
FIG. 21 is a side view of the device of FIG. 20 attached to a load beam.
Figure 22:
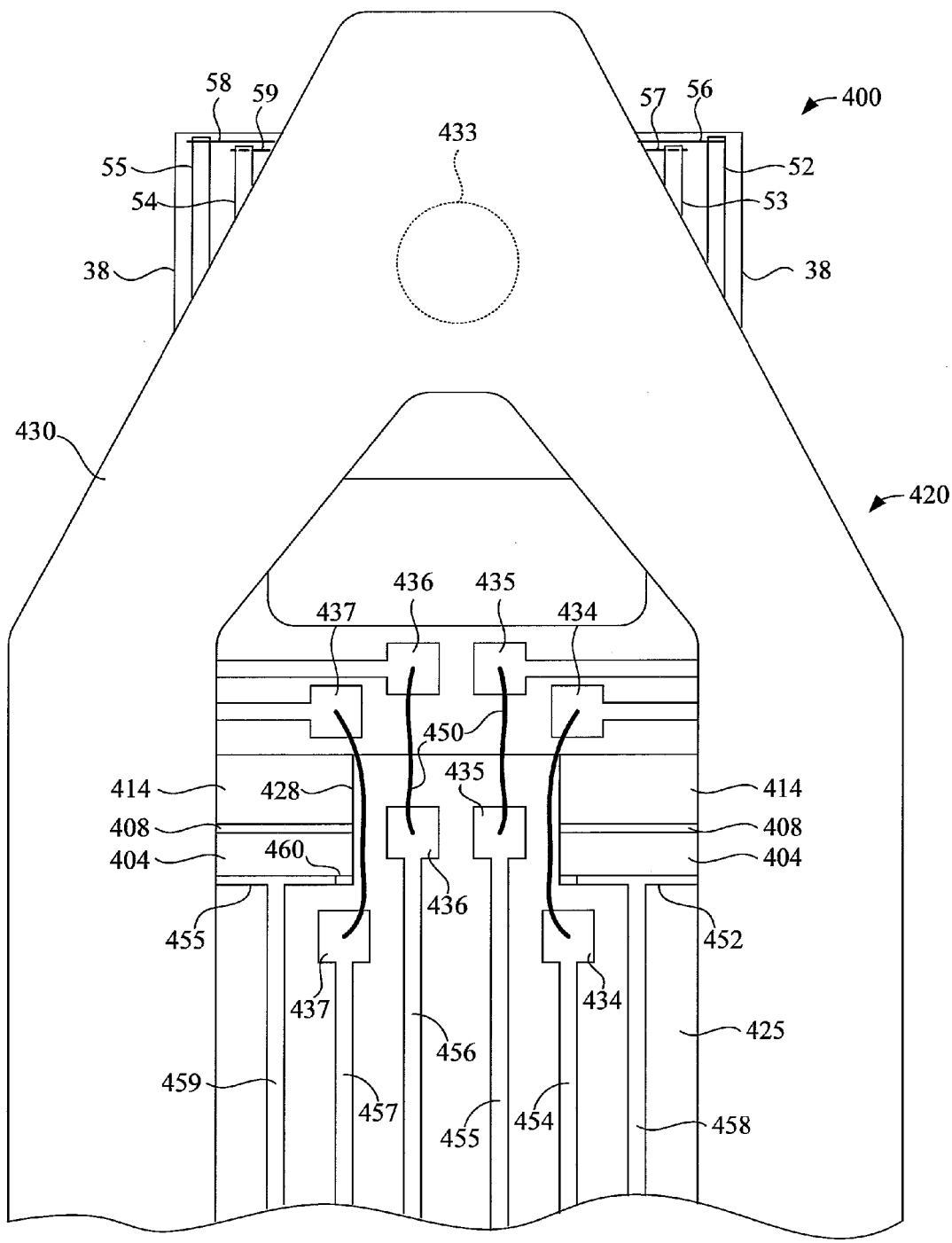
FIG. 22 is the device and load beam of FIG. 21 viewed from an opposite side as that shown in FIG. 20.

A base portion 414 of the substrate, conductive layer 408, and piezoelectric layer 404 retain a greater Z-direction thickness than flexures 38, for attachment to a load beam 420, as shown in FIG. 21. Referring additionally to FIG. 22, the load beam in this embodiment is laminated, with a first layer 422 having a similar thickness as piezoelectric layer 404, for abutting layers 404 and 422. A second layer 425 of the load beam sits atop layer 422 and terminates at substantially the same plane 423 as layer 422 for sections that are joined to piezoelectric layer 404. A tongue 428 of layer 425 extends beyond the end of first load beam layer 422, providing a guide for joining layer 422 to piezoelectric layer 404. Tongue 428 may optionally be attached to layers 404, 408 and/or base portion 414, providing increased support at a location subject to minimal electrostrictive induced movement. Layer 425 also separates the device 400 from a third load beam layer 430, except at protrusion 88, which may contact beam layer 430 during operation.

Conductive pads 434-437 are connected by wires 450 to conductive pads 444-447, respectively, which in turn are connected to leads 454-457 disposed on layer 425, allowing signals to pass between the transducers and drive electronics. Also disposed atop layer 425 are leads 458 and 459, which terminate in electrodes 452 and 455 respectively, which provide signals for positioning device 400. Such signals may be provided by drive electronics after processing the sensing by transducer 44 of servo markings in a media. In an embodiment in which leads 454-459 are formed on a polyamide layer, that layer may be folded to adhere electrodes 452 and 455 to the end of load beam layer 425. Providing increased support is a nonconductive central plate 460 that has substantially the same thickness as electrodes 452 and 455, helping to join the end of layer 422 with device end surface 420. Plate 460 and electrodes 452 and 455 may be attached to piezoelectric layer 404, first beam layer 422 and optionally second beam layer 425 with epoxy or other known bonding techniques. The distance between electrodes 452 and 455 may be greater than twice the distance between those electrodes and conductive layer 408.

Conductive pads 434-437 may be disposed on base portion 414 so as to minimize any mechanical effect on flexures 38 from wires 450. For this embodiment in particular, conventional twisted wires held by tubes or bends along lateral edges of layer 430 may replace conductive trace or printed circuit board leads 454-459. In such an embodiment, electrodes 452 and 455 may be separate metal plates that are attached to the end layer 422, in which case layer 425 may extend less than layer 422 except at the tongue, leaving room for bonding of leads 458 and 459 to electrodes 452 and 455, respectively. In another implementation, end plane 423 may be formed by bending tabs of layer 425, eliminating the need for layer 422.

Figure 23:
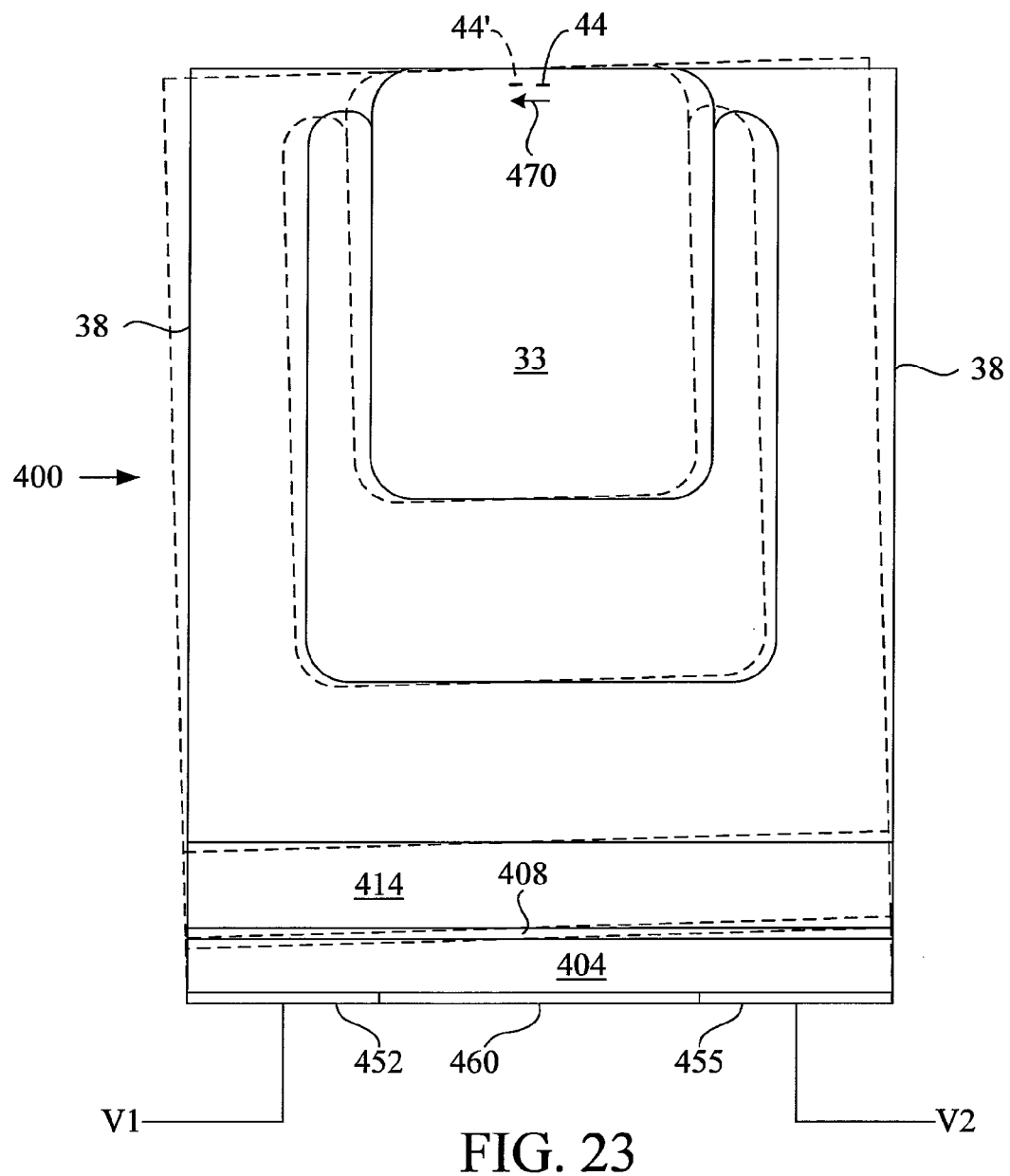
FIG. 23 is an outline view of media-facing side of a device of FIGS. 20-22, with motion induced by the actuator joining the device and load beam.

FIG. 23 illustrates the actuation of device 400 in response to signals V1 and V2 from the drive electronics, applied to electrodes 452 and 455. In order to focus on this aspect of the invention, only major features of device 400, such as head 33, flexures 38 and read element 44, are shown. Conductive layer 408 forms a common electrode opposite piezoelectric layer 404 from electrodes 452 and 455, so that when V1 is different than V2 one side of layer 404 expands and the other side contracts. This expansion and contraction of layer 404 causes device 400 to essentially pivot relative to plate 460, so that read element 44 moves as shown by arrow 470 to the location of 44'. The amount of lateral motion provided by this mechanism can be controlled by voltages V1 and V2, with the layer 404 expansion and contraction magnified by the length of the device from central plate 460 to read element 44 as compared to the distance between electrodes 452 and 455. In conjunction with a conventional voice coil actuator and servo controls, not shown, device 400 can be positioned over media tracks with an error of less than 50 nm.

As can be understood by comparing FIG. 23 with FIG. 21, flexures 38 are disposed substantially in a plane, and are preferentially stiff in a lateral or in-plane direction, and preferentially flexible in an out-of-plane or Z-direction. Because the motion induced by changing the dimensions of piezoelectric layer 404 is essentially confined to the in-plane direction of flexure 38, low frequency vibrations due to actuation are greatly reduced. Unlike other proposed microactuators, solid state device 400 does not include elements that interfere with flexure and gimbal mechanics, such as devices that rotate a head relative to an attached flexure or provide significant actuation in a preferentially flexible suspension direction. And unlike some proposed microactuators that move a laterally stiff plane of a flexible element away from the mass of the head, device 400 better aligns a laterally stiff plane of flexures 38 with the center of mass of the head 33.

Figure 24:
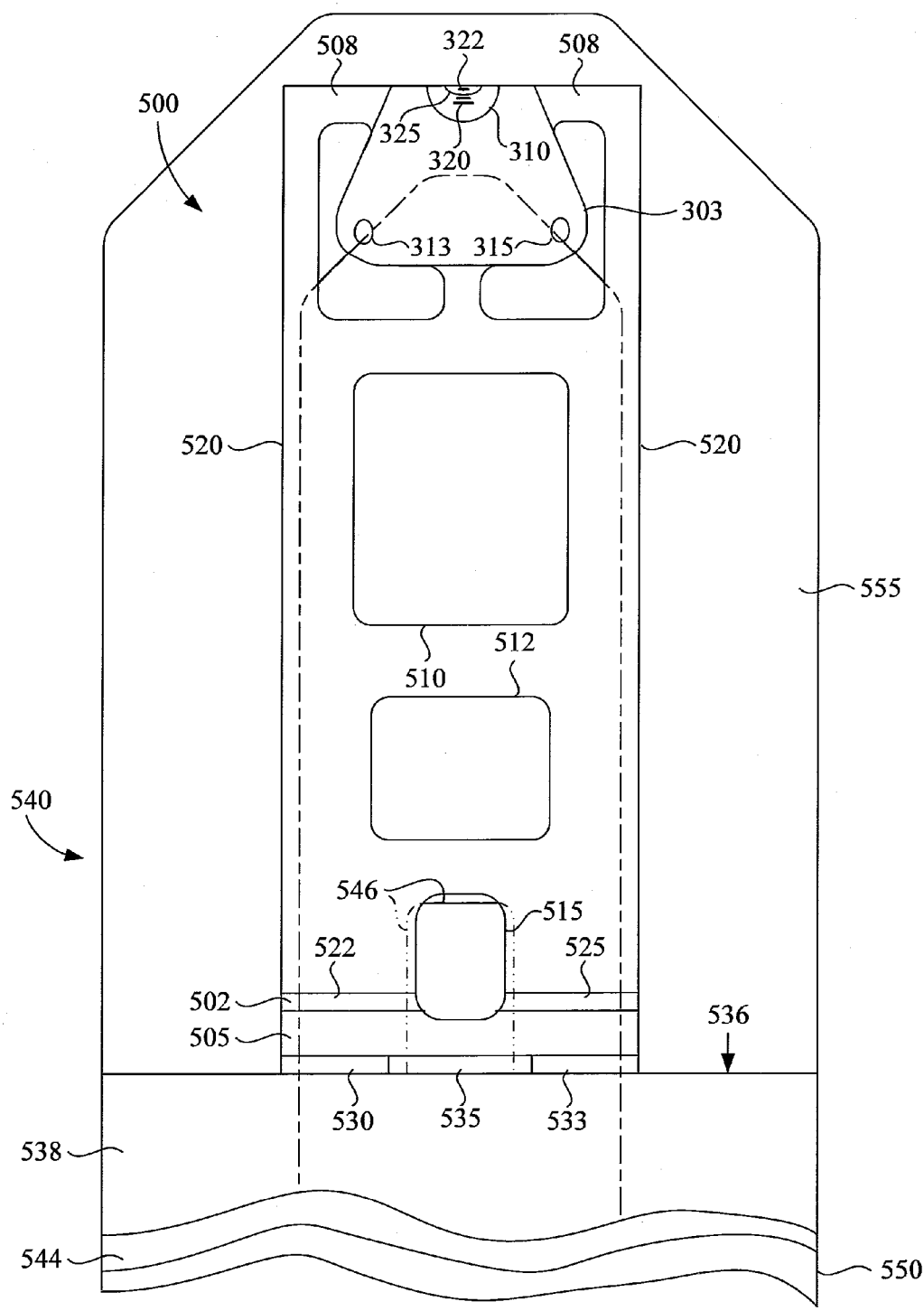
FIG. 24 is a view of media-facing side of a device of the present invention including an integrated head, gimbal, flexure and actuator having laterally spaced pairs of electrodes and attached to a load beam.
Figure 25:
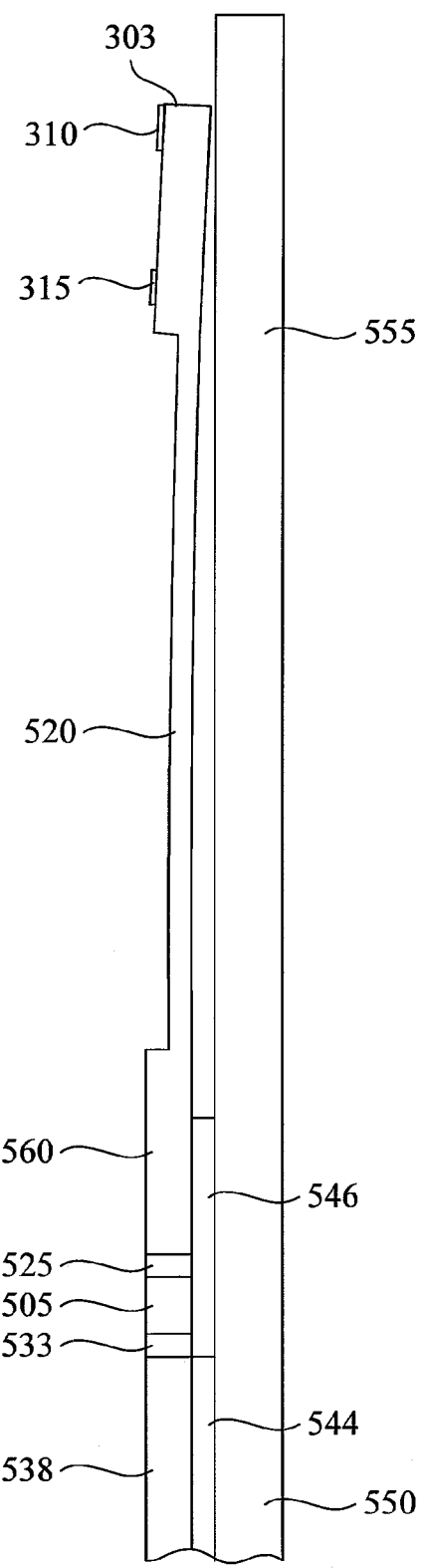
FIG. 25 is a side view of the device and load beam of FIG. 24.

FIG. 24 and FIG. 25 show another solid state device 500 including head, preferentially flexible elements and microactuator features. Device 500 is like device 300 shown in FIG. 17, and so for brevity elements that are similar between the two devices will not be described again. Device 500 is formed on and from a wafer substrate, which may for example be composed of silicon, alumina or $Al_2O_3TiC$, beginning with formation of a conductive layer 502 on a first major surface of the wafer. Conductive layer 502 may be composed of various metals or ceramic materials that are strong, adhere well to the substrate and survive potential annealing of a subsequently formed piezoelectric layer 505. Piezoelectric layer 505 is then formed atop conductive layer 502 to a thickness that may for example be in a range between about one micron and a few tens of microns, followed by annealing with an electric field provided between conductive layer 502 and an electrode, not shown, that may also provide the heat for annealing. After cooling and cleaning the wafer, the head elements are formed on an opposite surface of the wafer from layer 505, followed by separating the wafer into rows and working the rows to create the media-facing surfaces, heads, flexures and leads, much as described above.

Gimbal elements 508 may be formed entirely of thin films in this embodiment, and a number of apertures 510, 512 and 515 are formed along the length of the device, separating flexures 520. Aperture 515 separates conductive layer 502 into device electrodes 522 and 525. For clarity in displaying other elements, leads disposed on gimbals 508 and flexures 520 than connect with read 322 and write 320 elements are not shown in this figure. Device 500 may have a length, based primarily upon the thickness of the wafer, that is at least several times as long as the distance between electrodes 522 and 525. For example, device 500 may have a length that is about four millimeters and a width that is about one-half millimeter.

Piezoelectric layer 505 is bonded to beam electrodes 530 and 533 and nonconductive central plate 535, which are in turn bonded to a flat end 536 of a first layer 538 of a laminated load beam 540. A second beam layer 544 terminates at least as far from head 303 as the first beam layer 538, except for a tongue 546 which extends beyond end 536. Central plate 535 and a central portion of piezoelectric layer 505 may be bonded to tongue 546. A third beam layer 550 is separated from the first beam layer 538 by the second beam layer 544, the third beam layer extending in a loop 555 that overlaps the head 303. Beam 540 leads that connect with device 500 leads, both not shown in this figure, may be disposed on second beam layer 544 or may be held by tabs or in tubes of third beam layer 550. Beam 540 leads that supply charge and voltage to electrodes 522, 525, 530 and 533 may also be held by either second 544 or third 550 beam layers. In an alternative embodiment, electrodes 530 and 533 and nonconductive central plate 535 may extend in parallel to form first beam layer. A base portion 560 of device 500 has a greater thickness than flexible elements 508.

Having four electrodes 522, 525, 530 and 533 arranged as shown in FIG. 24 affords greater control of the piezoelectric expansion and contraction of layer 505, which is magnified by the geometry of device 500. For the case in which electrodes 522 and 533 are provided with matching voltages and electrodes 525 and 530 are provided with different matching voltages, a smoothly graded electric field exists across piezoelectric layer 505, causing contraction of one side of layer 505, expansion of the other side of that layer and neither contraction nor expansion at a midpoint of the layer. In conjunction with another, larger scale actuator that positions load beam 540, the microactuator formed by electrodes 522, 525, 530 and 533 and piezoelectric layer 505 may be used for damping and settling of vibrations, for stiction release, and for positioning of transducer 322 with an accuracy of less than 50 nm.

Figure 26:
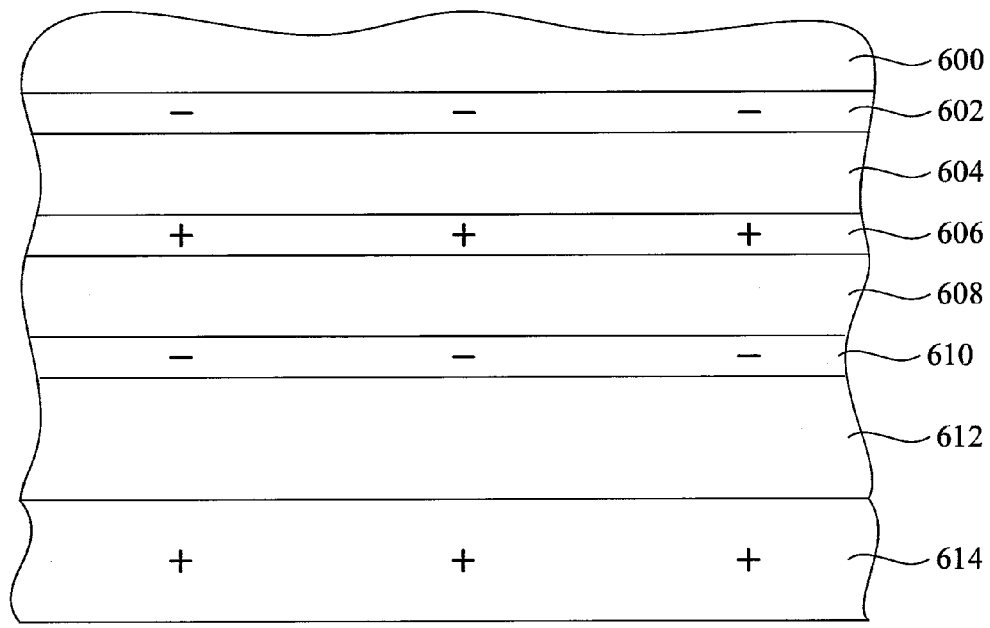
FIG. 26 is a cross-sectional view of the formation of layers for a laminated actuator.

FIG. 26 illustrates some initial steps in the formation of a laminated piezoelectric microactuator that may be attached to any of the head, flexure and conductor devices previously described, in similar fashion as device 500 shown in FIGS. 24 and 25. A wafer substrate 600 has a first conductive layer 602 formed on an opposite major surface from that on which head elements will later be formed. A first piezoelectric layer 604 is formed on the first conductive layer 602, followed by a second conductive layer 606, a second piezoelectric layer 608, a third conductive layer 610, and a third piezoelectric layer 612. The piezoelectric layers 604, 608 and 612 may be deposited or laid as a PZT tape or gel that is malleable until annealed.

To orient the inverse piezoelectric expansion and contraction of layers 604, 608 and 612, a conductive plate 614 is held adjacent to third piezoelectric layer 612 and leads are connected to conductive layers 602, 606, and 610 to provide high and low relative voltages, as indicated by the plus and minus signs, while the layers are annealed at an elevated temperature. Alternatively, another electrode layer can be deposited on layer 612, that layer later divided in the removal process that divides layers 604 and 608. A small portion of conductive 602, 606, and 610 may be left exposed in different areas near the perimeter of the wafer to afford electrical connection during polling. Upon cooling, layer 608 has a piezoelectric orientation opposite that of layers 604 and 612. As a result, subsequent application to conductors 602, 606, 610 and 614 of voltages similar to that shown, where a first voltage is interspaced with a different second voltage, causes piezoelectric layers 604, 608 and 612 to expand or contract in unison.

Figure 27:
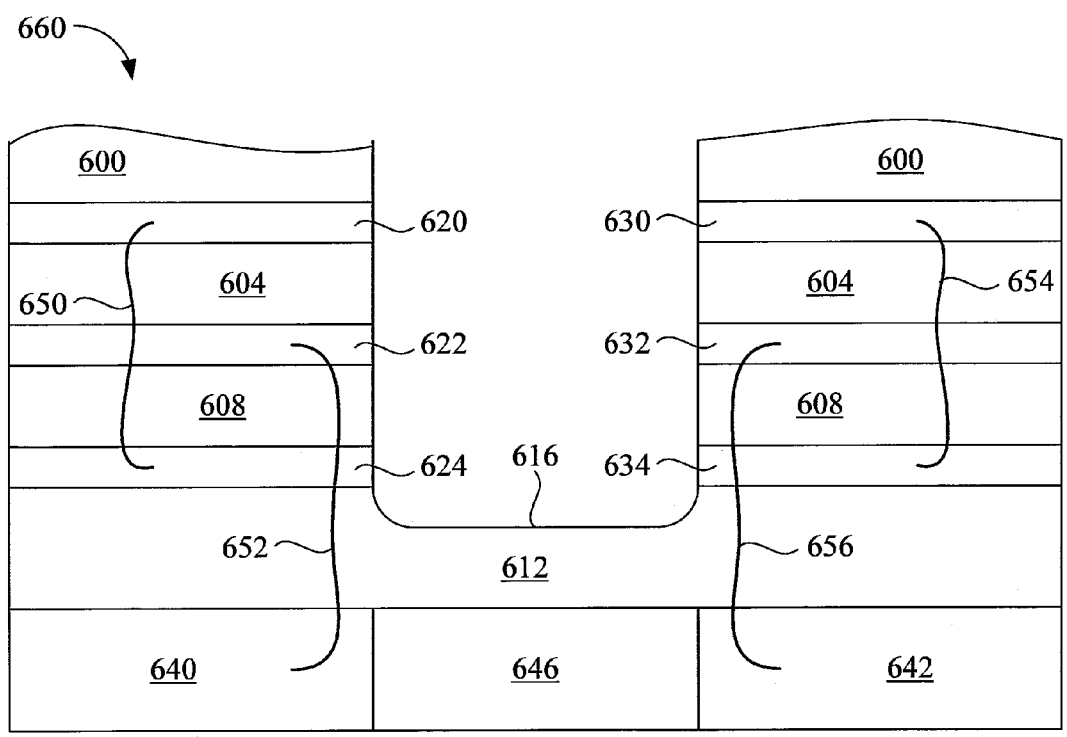
FIG. 27 is a top view of the layers of FIG. 26 formed into a laminated actuator on a substrate that may be part of a head and flexure device.

FIG. 27 shows a base portion of a head, flexure and conductor device 660 formed on and from the wafer substrate 600, including piezoelectric layers 604, 608 and 612. An aperture 616 has been formed that divides the conductive layers shown in FIG. 26 into individual electrodes 620, 622, 624 on the left side of aperture 616, and individual electrodes 630, 632 and 634 on the right side of aperture 616. Joined to piezoelectric layer 612 are first and second conductive plates, 640 and 642, which also serve as electrodes, and a nonconductive central plate 646. Wire or other conductive lead 650 electrically connects electrodes 620 and 624, and a similar wire or other conductive lead 654 electrically connects electrodes 630 and 634. Similarly, wire or other conductive lead 652 electrically connects electrodes 622 and 640, and a similar wire or other conductive lead 656 electrically connects electrodes 632 and 642. Plates 640, 642 and 646 are joined to or may be part of a load beam, not shown in this figure, and a central portion of piezoelectric layer 612 is joined to a tongue portion of that load beam.

Providing a first voltage to electrodes 620, 624, 632 and 642 while providing a different second voltage to electrodes 622, 640, 630 and 634 causes piezoelectric layers 604, 608 and 612 on the left side of aperture 616 to expand or contract relative to piezoelectric layers 604, 608 and 612 on the right side of aperture 616, which causes a head disposed on an opposite end of device 660 from layer 612 to move to the right or left. Forming plural piezoelectric layers oriented as described above allows the multiple electrodes to expand or contract the piezoelectric layers by providing a single, relatively low level voltage difference that expands the piezoelectric layers on one side in unison while contracting the layers on the other side in unison, magnifying the electrostriction effect for a given voltage difference.

Figure 28:
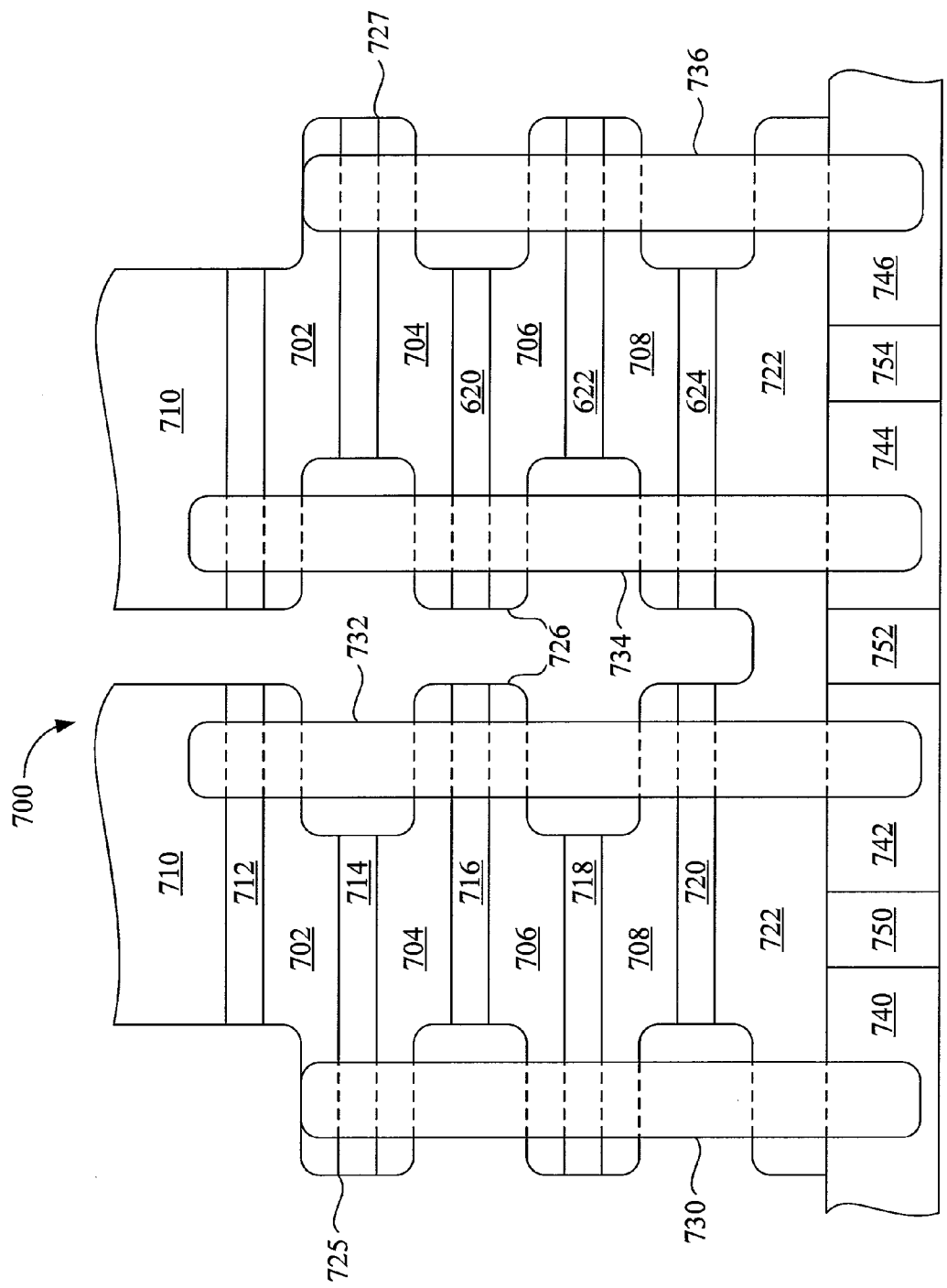
FIG. 28 is a top view of the layers of another embodiment of a laminated actuator connected to a substrate that may be part of a head and flexure device.

FIG. 28 shows a top view of an actuator 700 for which a number of electrostrictive layers 702, 704, 706 and 708 and electrically conductive layers 712, 714, 716 and 718 have been formed on a wafer substrate 710 as described above. An insulating base layer 722 has also been formed, after which an electromagnetic head or other device that is to be positioned by actuator 700 may be formed. Serpentine edges 725, 726 and 272 are then formed that allow conductive leads 730, 732, 734 and 736 to connect with alternate electrically conductive layers 712, 714, 716 and 718. Conductive leads 730, 732, 734 and 736 are also connected to electrodes 740, 742, 744 and 746, respectively, which are interspersed with insulators 750, 752 and 754. Application of a different voltage to lead 730 compared to lead 732 and to lead 734 compared to lead 736 causes an end of actuator 700 distal to layer 722 to move laterally. Alternatively, electrical leads similar to leads 730, 732, 734 and 736 may be formed in a zigzag or serpentine pattern to connect with alternate conductive layers, and the conductive layers and electrostrictive layers may be defined to have substantially straight edges. This embodiment may be advantageous for the case in which electrostrictive layers 702, 704, 706 and 708 are formed of submicron layers, e.g., of silicon dioxide.

Although this disclosure has focused on teaching the preferred embodiments of the invention claimed, other embodiments and modifications of this invention will be apparent to persons of ordinary skill in the art in view of these teachings. For example, while illustrated as employed in information storage and retrieval devices, the solid-state microactuators of the present invention may be used in many other disparate applications. Therefore, this invention is limited only by the following claims and their equivalents, which include all such embodiments and modifications when viewed in conjunction with the above specification and accompanying drawings.

The invention claimed is:

1. A device configured for attachment to an actuator, the device comprising:
a microactuator that is attached to the actuator, the microactuator including a plurality of solid actuator layers, the microactuator divided into a pair of sections that are separated from each other in a lateral direction such that an aperture without solid material is disposed between the sections;
a solid body that is attached to the microactuator, the solid body shaped as a plurality of flexible elements adjacent to the microactuator and shaped as a rigid portion distal to the microactuator, the flexible elements disposed laterally relative to each other such that the rigid portion is disposed between the flexible elements; and
an electromagnetic transducer that is part of the rigid portion, the electromagnetic transducer including a plurality of solid transducer layers;
wherein the microactuator, flexible elements and rigid portion are all intersected by a plane that extends in the lateral direction, such that actuation of the microactuator causes the electromagnetic transducer to move in the lateral direction.

2. The device of claim 1, wherein each of the sections of the microactuator includes a layer of piezoelectric material.

3. The device of claim 1, wherein:
each of the sections of the microactuator includes a layer of piezoelectric material, and
the transducer layers are substantially parallel with the layers of piezoelectric material.

4. The device of claim 1, wherein each of the sections of the microactuator includes a plurality of layers of piezoelectric material.

5. The device of claim 1, wherein:
the electromagnetic transducer is disposed between the flexible elements.

6. The device of claim 1, wherein the flexible elements and the actuator sections are substantially aligned with a center of mass of the rigid portion.

7. The device of claim 1, wherein the rigid portion has a media-facing-surface separated from a back surface in a Z-direction, and at least a part of the flexible elements is disposed at a Z-height between the surfaces.

8. The device of claim 1, wherein the microactuator, flexible elements and rigid portion all contain ceramic material.

9. The device of claim 1, wherein the rigid portion has a media-facing-surface separated from a back surface, and the back surface has a protrusion extending away from the media-facing surface.

10. The device of claim 1, wherein at least one of the flexible elements contains a plurality of conductive leads.

11. A device configured for attachment to an actuator, the device comprising:
a wafer substrate piece disposed between a plurality of flexible elements that are separated from each other in a lateral direction, the substrate piece shaped as a rigid body adjoining an electromagnetic transducer, with the plurality of flexible elements connecting the rigid body and a microactuator, the microactuator divided into a pair of sections, the sections separated from each other in the lateral direction such that an aperture without any solid material is disposed between the sections, wherein the substrate piece, the plurality of flexible elements and the microactuator are all intersected by a plane that extends along the lateral direction, such that actuation of the actuator causes the electromagnetic transducer to move in the lateral direction.

12. The device of claim 11, wherein each of the sections of the microactuator includes a layer of piezoelectric material.

13. The device of claim 11, wherein:
each of the sections of the microactuator includes a layer of piezoelectric material, and
the transducer includes a plurality of layers that are substantially parallel with the layers of piezoelectric material.

14. The device of claim 11, wherein the microactuator, flexible elements and rigid body all contain ceramic material.

15. The device of claim 11, wherein the microactuator includes a plurality of layers of piezoelectric material interspersed with a plurality of layers of electrically conductive materials.

16. The device of claim 11, wherein:
the microactuator includes a plurality of layers of piezoelectric material interspersed with a plurality of layers of electrically conductive materials, and
alternate layers of said layers of electrically conductive materials are interconnected.

17. The device of claim 11, wherein the rigid body has a media-facing-surface separated from a back surface, and the back surface has a protrusion extending away from the media-facing surface.

18. The device of claim 11, wherein the rigid body and the actuator contain a material including silicon.

19. The device of claim 11, wherein the device includes means for providing electrical voltage to the microactuator.

20. A device configured for attachment to an actuator, the device comprising:
a microactuator including a base part and a pair of piezoelectric sections that are separated from each other in a lateral direction such that there is an aperture with no solid material disposed between the sections, with a pair of flexible sections that are separated from each other in a lateral direction being attached to the base part and to the piezoelectric sections, and a rigid body that is held between the flexible sections and attached to the flexible sections, the rigid body including an electromagnetic transducer disposed adjacent to an end of the rigid body located furthest from the base part, wherein the microactuator and the rigid body are made primarily of ceramic materials and are intersected by a plane that extends along the lateral direction, and actuation of the microactutor causes the electromagnetic transducer to move in the lateral direction.

* * * * *